(12) United States Patent
Kuwamori et al.

(10) Patent No.: US 11,983,612 B2
(45) Date of Patent: May 14, 2024

(54) CLASSIFICATION DEVICE, CLASSIFICATION METHOD, AND RECORDING MEDIUM

(71) Applicants: NEC CORPORATION, Tokyo (JP); NATIONAL INSTITUTE OF ADVANCED INDUSTRIAL SCIENCE AND TECHNOLOGY, Tokyo (JP)

(72) Inventors: Naoki Kuwamori, Tokyo (JP); Yousuke Taira, Tokyo (JP); Takuya Itaki, Tsukuba (JP); Toshinori Maebayashi, Hiratsuka (JP); Satoshi Takeshima, Nagoya (JP); Kenji Toya, Tokyo (JP)

(73) Assignees: NEC CORPORATION, Tokyo (JP); NATIONAL INSTITUTE OF ADVANCED INDUSTRIAL SCIENCE AND TECHNOLOG, Tokyo (JP)

( * ) Notice: Subject to any disclaimer, the term of this patent is extended or adjusted under 35 U.S.C. 154(b) by 569 days.

(21) Appl. No.: 17/271,369

(22) PCT Filed: May 10, 2019

(86) PCT No.: PCT/JP2019/018730
§ 371 (c)(1),
(2) Date: Feb. 25, 2021

(87) PCT Pub. No.: WO2020/044665
PCT Pub. Date: Mar. 5, 2020

(65) Prior Publication Data
US 2021/0248430 A1    Aug. 12, 2021

(30) Foreign Application Priority Data
Aug. 31, 2018  (JP) .................................. 2018-163981

(51) Int. Cl.
*G06N 20/00* (2019.01)
*G06F 18/2415* (2023.01)
(Continued)

(52) U.S. Cl.
CPC ......... *G06N 20/00* (2019.01); *G06F 18/2415* (2023.01); *G06F 18/2431* (2023.01);
(Continued)

(58) Field of Classification Search
None
See application file for complete search history.

(56) References Cited

U.S. PATENT DOCUMENTS 11,140,115 B1 * 10/2021 Lukacs ................... H04L 51/18
2001/0042068 A1 * 11/2001 Yoshida ............... G05B 19/401
707/999.005

(Continued)

FOREIGN PATENT DOCUMENTS

JP    5-306987 A    11/1993
JP    2005-115569 A    4/2005
(Continued)

OTHER PUBLICATIONS

Bollmann J, Quinn PS, Vela M, Brabec B, Brechner S, Cortes MY, Hilbrecht H, Schmidt DN, Schiebel R, Thierstein HR. Automated particle analysis: calcareous microfossils. Image analysis, sediments and paleoenvironments. 2004:229-52. (Year: 2004).*
(Continued)

*Primary Examiner* — Michelle M Entezari Hausmann
(74) *Attorney, Agent, or Firm* — Sughrue Mion, PLLC

(57) ABSTRACT

A classification device includes: an imaging unit that images a plurality of granular classification target objects each of which is disposed in one of a plurality of holes provided in a tray to acquire an image including the plurality of classification target objects; an acquisition unit that acquires
(Continued)

| SPECIES | MICROFOSSIL A | MICROFOSSIL B | MICROFOSSIL C | MICROFOSSIL D | AVERAGE + SD |
|---|---|---|---|---|---|
| PARTICLE a | 0.10 | 0.15 | 0.80 | 0.05 | 0.57 |
| PARTICLE b | 0.98 | 0.20 | 0.50 | 0.80 | 0.57 |
| PARTICLE c | 0.05 | 0.10 | 0.60 | 0.15 | 0.41 |
| PARTICLE d | 0.15 | 0.98 | 0.90 | 0.20 | 0.77 | images of each of the plurality of classification target objects by cutting out the images from the acquired image; and a sorting unit that classifies the acquired images of each of the plurality of classification target objects by using machine learning results and sorts the plurality of classification target objects based on the classification result.

8 Claims, 12 Drawing Sheets

(51) Int. Cl.
*G06F 18/2431* (2023.01)
*G06N 7/01* (2023.01)
*G06V 10/26* (2022.01)
*G06V 10/764* (2022.01)
*G06V 10/774* (2022.01)
*G06V 20/69* (2022.01)

(52) U.S. Cl.
CPC ............. *G06N 7/01* (2023.01); *G06V 10/267* (2022.01); *G06V 10/764* (2022.01); *G06V 10/774* (2022.01); *G06V 20/698* (2022.01)

(56) References Cited

U.S. PATENT DOCUMENTS

| | | | |
|---|---|---|---|
| 2005/0082207 A1 | 4/2005 | Deppermann | |
| 2014/0267009 A1* | 9/2014 | DeLean | G06V 40/28 345/156 |
| 2015/0178596 A1* | 6/2015 | Bengio | G06N 20/00 382/224 |
| 2018/0011071 A1* | 1/2018 | Sigman | G06F 17/18 |
| 2019/0003979 A1* | 1/2019 | Rowlen | G01N 33/539 |
| 2022/0300364 A1* | 9/2022 | Nagaraddi | G06N 3/08 |

FOREIGN PATENT DOCUMENTS

| | | |
|---|---|---|
| JP | 2006-72659 A | 3/2006 |
| JP | 2007-48172 A | 2/2007 |
| JP | 2009-210465 A | 9/2009 |
| JP | 2010-210318 A | 9/2010 |
| WO | 2007/091450 A1 | 8/2007 |
| WO | 2015/133337 A1 | 9/2015 |

OTHER PUBLICATIONS

Solano, Geoffrey A., Perlita Gasmen, and Edanjarlo J. Marquez. "Radiolarian classification decision support using supervised and unsupervised learning approaches." 2018 9th international conference on information, intelligence, systems and applications (IISA). IEEE, 2018. (Year: 2018).*

Juang, Li-Hong, and Ming-Ni Wu. "Psoriasis image identification using k-means clustering with morphological processing." Measurement 44.5 (2011): 895-905. (Year: 2011).*

Ozer, Ilyas, et al. "Towards investigation of transfer learning framework for *Globotruncanita* genus and *Globotruncana* genus microfossils in Genus-Level and Species-Level prediction." Engineering Science and Technology, an International Journal 48 (2023): 101589. (Year: 2023).*

Shi, Jichuan, and Hong Zhang. "Adaptive local threshold with shape information and its application to object segmentation." 2009 IEEE International Conference on Robotics and Biomimetics (ROBIO). IEEE, 2009. (Year: 2009).*

Pham, Tuan D. "Spatial uncertainty modeling of fuzzy information in images for pattern classification." Plos one 9.8 (2014): e105075. (Year: 2014).*

Hachama, Mohamed, Agnès Desolneux, and Frédéric JP Richard. "Bayesian technique for image classifying registration." IEEE Transactions on image processing 21.9 (2012): 4080-4091. (Year: 2012).*

Mahalingam, T., and M. Mahalakshmi. "Vision based moving object tracking through enhanced color image segmentation using Haar classifiers." Trendz in Information Sciences & Computing (TISC2010). IEEE, 2010. (Year: 2010).*

Muthu Rama Krishnan, M., et al. "Statistical analysis of textural features for improved classification of oral histopathological images." Journal of medical systems 36 (2012): 865-881. (Year: 2012).*

Camps-Valls, Gustavo, and Lorenzo Bruzzone. "Kernel-based methods for hyperspectral image classification." IEEE Transactions on Geoscience and Remote Sensing 43.6 (2005): 1351-1362. (Year: 2005).*

Decision of Rejection dated Mar. 15, 2022 from the Japanese Patent Office in JP Application No. 2020-540055.

International Search Report dated Aug. 6, 2019 in International Application No. PCT/JP2019/018730.

Hoshino et al., "Automated microfossil classification by image recognition and machine learning to develop an AI system for age-dating", JpGU AGU Joint Meeting 2017, vol. 2017, MIS22-06 (2 pages total).

Itaki et al., "Automatic classification of radiolarians based on AI (artificial intelligence) technology and its future prospects", lecture preprints of the 167th regular conference of the Paleontological Society of Japan, B22, p. 30, Feb. 4, 2018 (3 pages total).

Itaki et al., "A new tool for microfossil analysis—Microscopic system with automatic image collector collaborated with Artificial Intelligence", Japan Geoscience Union Meeting 2018, MIS10-10 (3 pages total).

Itaki et al., "A new tool for microfossil analysis—Microscopic system with automatic image collector collaborated with Artificial Intelligence", JpGU 2018 (22 pages total).

Itaki et al., "Attempt on automatic collection of radiolarian assemblage data based on AI (Artificial Intelligence) technology", Abstracts with Programs, The 2018 Annual Meeting, The Paleontological Society of Japan, 2018, A03, p. 14 (21 pages total).

Itaki et al., "Attempt on automatic collection of radiolarian assemblage data based on AI (Artificial Intelligence) technology", The 2018 Annual Meeting, The Paleontological Society of Japan, 2018 (18 pages total).

* cited by examiner

FIG. 6

| SPECIES | MICROFOSSIL A | MICROFOSSIL B | MICROFOSSIL C | MICROFOSSIL D | AVERAGE + SD |
|---|---|---|---|---|---|
| PARTICLE a | 0.10 | 0.15 | 0.80 | 0.05 | 0.57 |
| PARTICLE b | 0.98 | 0.20 | 0.50 | 0.80 | 0.57 |
| PARTICLE c | 0.05 | 0.10 | 0.60 | 0.15 | 0.41 |
| PARTICLE d | 0.15 | 0.98 | 0.90 | 0.20 | 0.77 |

FIG. 7

| SPECIES | MICROFOSSIL A | MICROFOSSIL B | MICROFOSSIL C | MICROFOSSIL D | LEFT SIDE | RIGHT SIDE |
|---|---|---|---|---|---|---|
| PARTICLE a | 0.10 | 0.15 | 0.80 | 0.05 | 0.09 < | 0.22 |
| PARTICLE b | 0.98 | 0.20 | 0.50 | 0.80 | 2.25 > | 1.63 |
| PARTICLE c | 0.05 | 0.10 | 0.60 | 0.15 | 0.09 < | 0.15 |
| PARTICLE d | 0.15 | 0.98 | 0.90 | 0.20 | 1.56 > | 0.06 |

FIG. 8

| SPECIES | MICROFOSSIL A | MICROFOSSIL B | MICROFOSSIL C | MICROFOSSIL D | A AFTER NORMALIZATION | B AFTER NORMALIZATION | C AFTER NORMALIZATION | D AFTER NORMALIZATION |
|---|---|---|---|---|---|---|---|---|
| PARTICLE a | 0.10 | 0.15 | 0.80 | 0.05 | 0.09 | 0.14 | 0.73 | 0.05 |
| PARTICLE b | 0.98 | 0.20 | 0.50 | 0.80 | 0.40 | 0.08 | 0.20 | 0.32 |
| PARTICLE c | 0.05 | 0.10 | 0.60 | 0.15 | 0.06 | 0.11 | 0.67 | 0.17 |
| PARTICLE d | 0.15 | 0.98 | 0.90 | 0.20 | 0.07 | 0.44 | 0.40 | 0.09 |

FIG. 9

| SPECIES | MICROFOSSIL A | MICROFOSSIL B | MICROFOSSIL C | MICROFOSSIL D |
|---|---|---|---|---|
| PARTICLE a | 0.10 | 0.15 | 0.80 | 0.05 |
| PARTICLE b | 0.98 | 0.20 | 0.50 | 0.80 |
| PARTICLE c | 0.05 | 0.10 | 0.60 | 0.15 |
| PARTICLE d | 0.15 | 0.98 | 0.90 | 0.20 |
| COMPOSITION STANDARD | 0.15 | 0.19 | 0.50 | 0.16 |

FIG. 10

| SPECIES | MICROFOSSIL A | MICROFOSSIL B | MICROFOSSIL C | MICROFOSSIL D |
|---|---|---|---|---|
| PARTICLE a | 0.10 | 0.15 | 0.80 | 0.05 |
| PARTICLE b | 0.98 | 0.20 | 0.50 | 0.80 |
| PARTICLE c | 0.05 | 0.10 | 0.60 | 0.15 |
| PARTICLE d | 0.15 | 0.98 | 0.90 | 0.20 |

CLASSIFICATION DEVICE, CLASSIFICATION METHOD, AND RECORDING MEDIUM

CROSS REFERENCE TO RELATED APPLICATIONS

This application is a National Stage of International Application No. PCT/JP2019/018730 filed May 10, 2019, claiming priority based on Japanese Patent Application No. 2018-163981 filed Aug. 31, 2018.

TECHNICAL FIELD

The present invention relates to a classification device, a classification method and a recording medium.

BACKGROUND ART

In relation to the classification of fine particles, Patent Document 1 describes a screening device that selects and obtains fine particles in a liquid. This screening device measures the fluorescence emitted by the fine particles in the liquid such as cells in a test solution, and identifies the fine particles that satisfy a recovery condition, such as the brightness of the fluorescence exceeding a predetermined threshold value, as a target sample. Then, this screening device acquires the target sample using a suction/discharge capillary.

PRIOR ART DOCUMENTS

Patent Document

[Patent Document 1] Re-publication of PCT International Publication No. 2015/133337

SUMMARY OF THE INVENTION

Problem to be Solved by the Invention

As a method for classifying fine particles, in addition to the method for classifying fine particles using the brightness of fluorescence emitted by the fine particles, a method for classifying fine particles based on the shape of the fine particles can be considered. For example, it is conceivable that a person (classification worker) looks at fine particles with a microscope to ascertain the shapes thereof and then classifies the fine particles. However, when this method is used, if the number of fine particles to be classified increases, the time required for classification increases, and the burden on the classification worker increases.

An example object of the present invention is to provide a classification device, a classification method, and a recording medium capable of solving the above-mentioned problems.

Means for Solving the Problem

According to a first example aspect of the present invention, a classification device includes: an imaging unit that images a plurality of granular classification target objects each of which is disposed in one of a plurality of holes provided in a tray to acquire an image including the plurality of classification target objects; an acquisition unit that acquires images of each of the plurality of classification target objects by cutting out the images from the acquired image; and a sorting unit that classifies the acquired images of each of the plurality of classification target objects by using machine learning results and sorts the plurality of classification target objects based on the classification result.

According to a second example aspect of the present invention, a classification device includes: an imaging unit that images a plurality of granular classification target objects each of which is disposed in one of a plurality of holes provided in a tray to acquire an image including the plurality of classification target objects; an acquisition unit that acquires images of each of the plurality of classification target objects by cutting out the images from the acquired image; and a classification unit that classifies the acquired images of each of the plurality of classification target objects by using machine learning results.

According to a third example aspect of the present invention, a classification method includes: imaging a plurality of granular classification target objects each of which is disposed in one of a plurality of holes provided in a tray to acquire an image including the plurality of classification target objects; acquiring images of each of the plurality of classification target objects by cutting out the images from the acquired image; and classifying the acquired images of each of the plurality of classification target objects by using machine learning results and sorting the plurality of classification target objects based on the classification result.

According to a fourth example aspect of the present invention, a classification method includes: imaging a plurality of granular classification target objects each of which is disposed in one of a plurality of holes provided in a tray to acquire an image including the plurality of classification target objects; acquiring images of each of the plurality of classification target objects by cutting out the images from the acquired image; and classifying the acquired images of each of the plurality of classification target objects by using machine learning results.

According to a fifth example aspect of the present invention, a recording medium stores a program that causes a computer to execute: imaging a plurality of granular classification target objects each of which is disposed in one of a plurality of holes provided in a tray to acquire an image including the plurality of classification target objects; acquiring images of each of the plurality of classification target objects by cutting out the images from the acquired image; and classifying the acquired images of each of the plurality of classification target objects by using machine learning results and sorting the plurality of classification target objects based on the classification result.

According to a sixth example aspect of the present invention, a recording medium stores a program that causes a computer to execute: imaging a plurality of granular classification target objects each of which is disposed in one of a plurality of holes provided in a tray to acquire an image including the plurality of classification target objects; acquiring images of each of the plurality of classification target objects by cutting out the images from the acquired image; and classifying the acquired images of each of the plurality of classification target objects by using machine learning results.

Effects of the Invention

According to the present invention, the burden on a person when classifying fine particles can be made relatively small.

BRIEF DESCRIPTION OF THE DRAWINGS

FIG. 6 is a diagram showing an example of classification based on the criteria of Equation (1) in the example embodiment.

FIG. 7 is a diagram showing an example of classification based on the criteria of Equation (4) in the example embodiment.

FIG. 8 is a diagram showing an example of classification based on the criteria of Equation (6) in the example embodiment.

FIG. 9 is a diagram showing an example of a composition ratio (composition proportion) calculated by the classification unit according to the example embodiment using Equations (7) and (8).

FIG. 10 is a diagram showing an example of classification based on Equation (10) in the example embodiment.

EXAMPLE EMBODIMENTS

Hereinbelow, example embodiments of the present invention will be described, but the following example embodiments do not limit the invention according to the claims. Also, not all combinations of features described in the example embodiment may be essential to the means of solving the invention.

Figure 1:
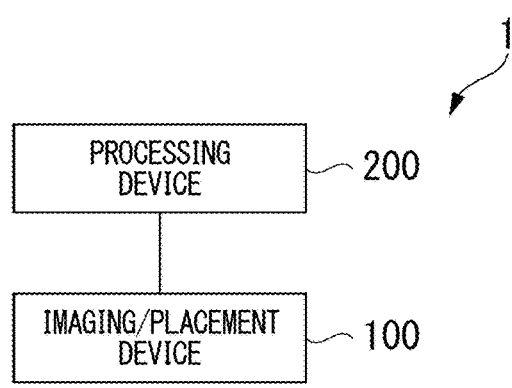
FIG. 1 is a schematic block diagram showing a configuration example of a classification device according to an example embodiment.

FIG. 1 is a schematic block diagram showing a configuration example of a classification device according to an example embodiment. As shown in FIG. 1, a classification device 1 includes an imaging/placement device (imaging and placement device) 100 and a processing device 200.

The classification device 1 classifies granular classification target objects. Granular objects to be classified by the classification device 1 are also referred to as fine particles.

In the following, a case where the classification device 1 classifies microfossils according to the type of microfossil will be described as an example. The microfossils referred to here are fine granular fossils. The type of microfossil referred to here is the type of organism that has become a microfossil. The type of microfossil corresponds to an example of class in classification (classification).

However, the fine particles to be classified by the classification device 1 are not limited to specific types. The size of the fine particles to be classified by the classification device 1 may be, but is not limited to, the size of sand grains (62.5 micrometers ($\mu$m) or more and 2 millimeters (mm) or less). The class into which the classification device 1 classifies fine particles is not limited to a specific one.

The imaging/placement device 100 captures an image for classifying microfossils. Further, the imaging/placement device 100 performs sorting of the microfossils on the basis of the classification result of the microfossils.

The processing device 200 controls the imaging/placement device 100 to capture an image of the microfossils, and classifies the microfossils using the obtained image. Further, the processing device 200 controls the imaging/placement device 100 to sort the microfossils according to the classification. The processing device 200 is configured by using a computer such as a personal computer (PC) or a workstation (workstation), for example.

Figure 2:
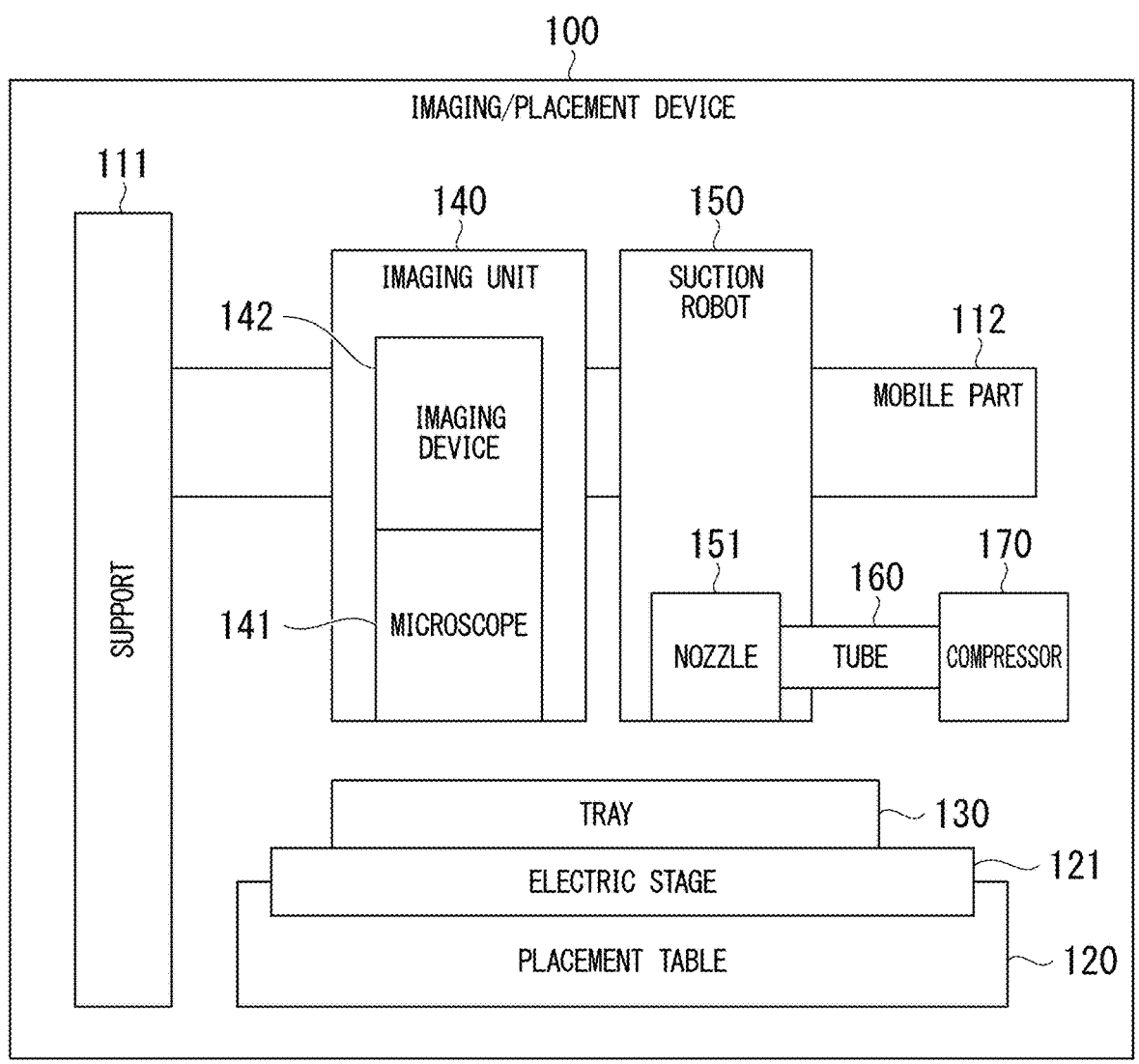
FIG. 2 is a schematic configuration diagram showing an example of the configuration of an imaging/placement device according to the example embodiment.

FIG. 2 is a schematic configuration diagram showing an example of the configuration of the imaging/placement device 100. In the configuration shown in FIG. 2, a mobile part 112 is supported by a support 111 and is provided so as to be movable in the vertical direction. Further, an imaging unit 140 and a suction robot 150 are installed on the mobile part 112. The imaging unit 140 includes a microscope 141 and an imaging device 142. The suction robot 150 includes a nozzle 151. The nozzle 151 is connected to a compressor 170 via a tube 160.

A placement table 120 is installed below the imaging unit 140 and the suction robot 150. The placement table 120 is provided with an electric stage 121 on the upper surface of the placement table 120 itself. A tray 130 is placed on the electric stage 121.

Figure 3:
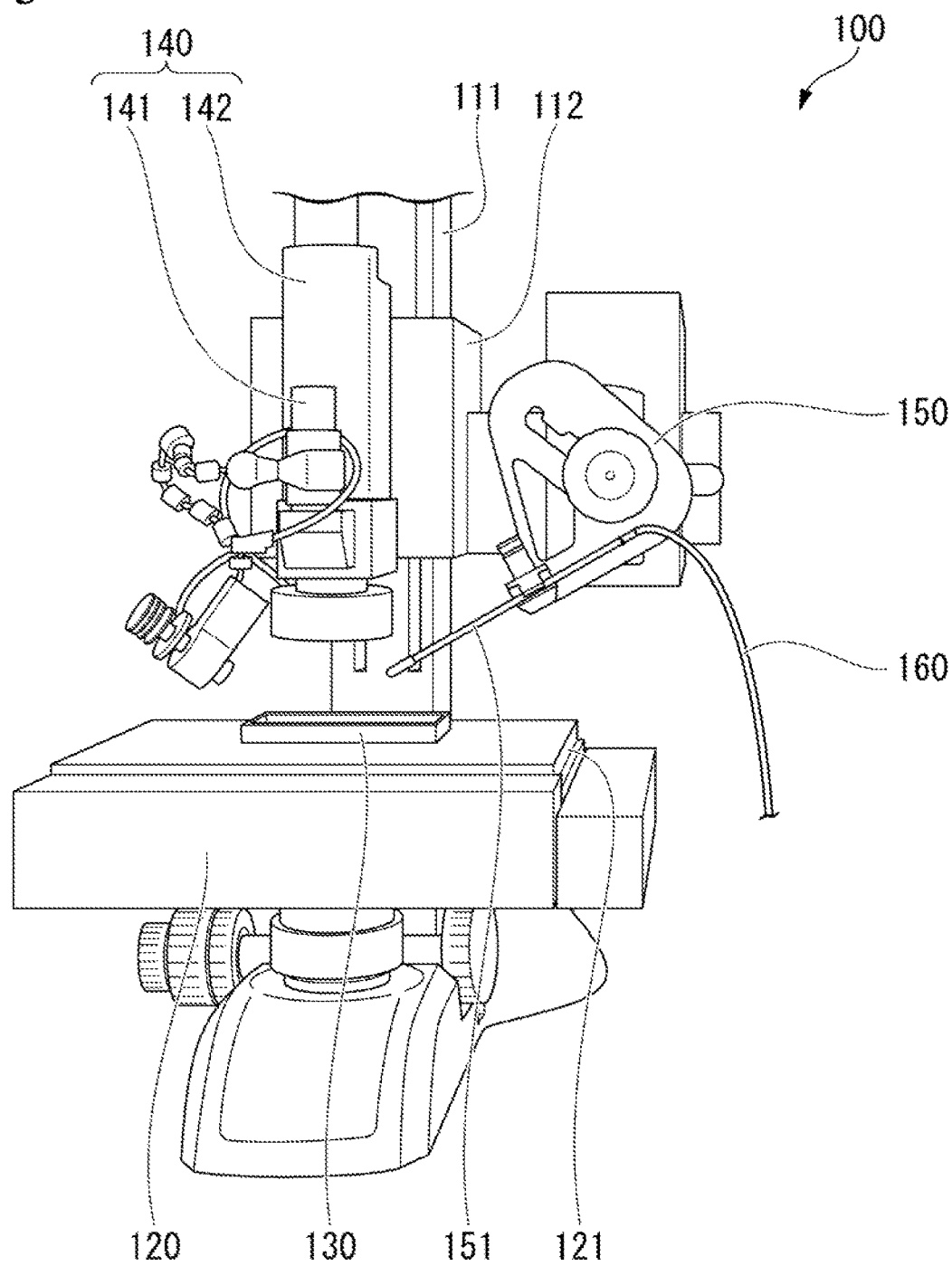
FIG. 3 is a diagram showing an outline of an outline example of the imaging/placement device according to the example embodiment.

FIG. 3 is a diagram showing an external example of the imaging/placement device 100. In FIG. 3, among the parts of the imaging/placement device 100 described with reference to FIG. 2, the support 111, the mobile part 112, the placement table 120, the electric stage 121, the tray 130, the microscope 141 and the imaging device 142 of the imaging unit 140, the suction robot 150 including the nozzle 151, and the tube 160 are shown.

In the imaging/placement device 100 having the configuration shown in FIGS. 2 and 3, the tray 130 accommodates the microfossils, and the imaging unit 140 images the microfossils on the tray 130. The suction robot 150 temporarily sucks the microfossils on the tray 130 and moves the microfossils on the tray 130.

The electric stage 121 moves the tray 130 two-dimensionally in the horizontal direction by moving itself two-dimensionally in the horizontal direction (front-back and left-right). In addition, the mobile part 112 moves the imaging unit 140 and the suction robot 150 up and down by moving itself up and down. As a result, the relative positions of the tray 130, and the imaging unit 140 and the suction robot 150 can be changed three-dimensionally (either forward/backward, left/right, and up/down).

In the imaging unit 140, the imaging device 142 images the tray 130 through the microscope 141. As a result, the imaging device 142 captures a magnified image (microscopic image) of the microfossils on the tray 130.

In the suction robot 150, the diameter of the tip of the nozzle 151 is smaller than the size (diameter) of each microfossil. With the tip of the nozzle 151 being located near the microfossil to be moved, the compressor 170 sucks air from the tip of the nozzle 151 through the tube 160, so that the nozzle 151 sucks the microfossil to be moved. Since the diameter of the tip of the nozzle 151 is smaller than the size of the microfossil, the microfossil is not sucked into the nozzle 151 and is temporarily adsorbed on the tip of the nozzle 151.

When the imaging unit 140 images microfossils on the tray 130, the distance between the imaging unit 140 and the tray 130 is adjusted by moving the mobile part 112 up and down. The imaging unit 140 repeats the imaging while the electric stage 121 moves two-dimensionally in the horizontal direction, so that the imaging unit 140 images the entire upper surface of the tray 130. Thereby, the imaging unit 140 images all the microfossils on the tray 130.

When the suction robot 150 moves the microfossil, the electric stage 121 moves the tray 130 in the horizontal direction to position the microfossil to be moved near the tip of the nozzle 151. In this state, the compressor 170 sucks air as described above, so that the nozzle 151 adsorbs the microfossil to be moved to the tip of the nozzle 151 itself. The suction robot 150 lifts the tip of the nozzle 151, and the electric stage 121 moves the tray 130 in the horizontal direction to bring the position of the destination of the microfossil on the tray 130 near the tip of the nozzle 151. When the suction robot 150 lowers the tip of the nozzle 151 and the compressor 170 stops sucking air, the suction force of the nozzle 151 disappears, and the microfossil falls to the destination position on the tray 130.

The combination of the electric stage 121, the tray 130, the suction robot 150, the tube 160, and the compressor 170 corresponds to an example of the sorting unit, and performs sorting of the microfossils on the basis of the classification result of the microfossils.

If the microfossil adheres to the tip of the nozzle 151 due to static electricity, it is conceivable that the microfossil will remain attached to the tip of the nozzle 151 even if the compressor 170 stops sucking air. In order to prevent this, an adhesive sheet having a relatively weak adhesive force may be installed on the upper surface of the tray 130 so that the microfossils adhere to the adhesive sheet. Alternatively, adhesion of microfossils to the tip of the nozzle 151 due to static electricity may be prevented by generating a mist of ions near the tip of the nozzle 151 to prevent the accumulation of static electricity.

Figure 4:
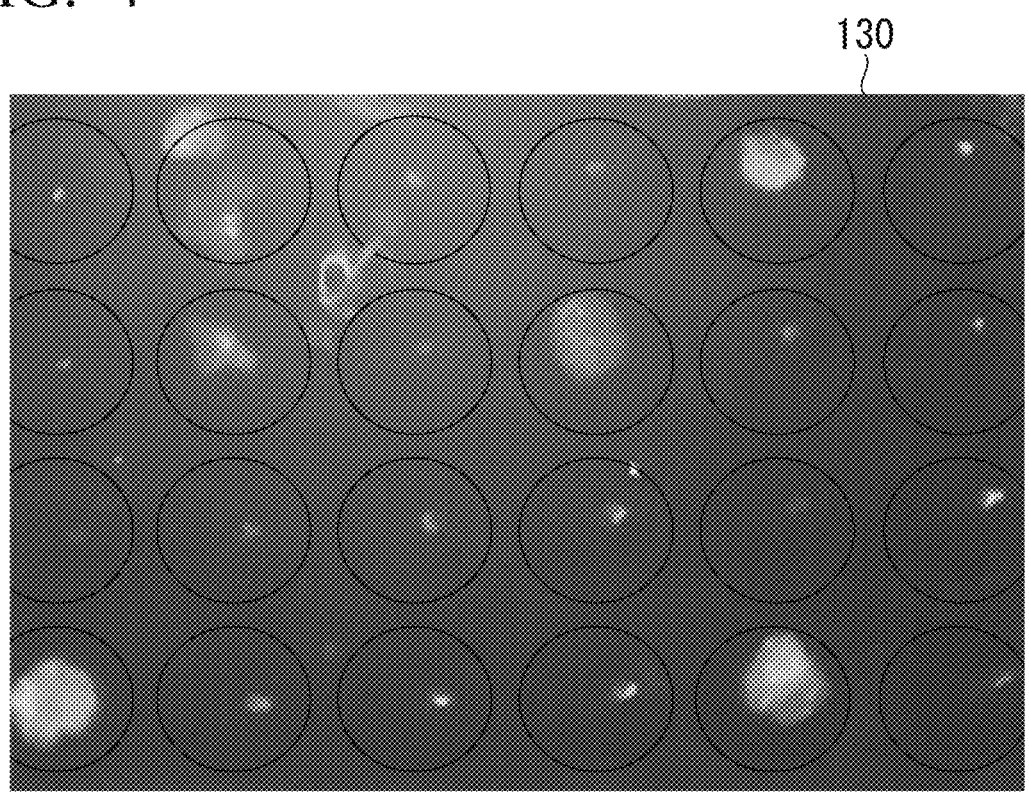
FIG. 4 is a diagram showing an example of the shape of a tray according to the example embodiment.

FIG. 4 is a diagram showing an example of the shape of the tray 130. In the example of FIG. 4, on the upper surface of the tray 130, holes (recesses) having a size for one microfossil to enter are provided vertically and horizontally in the horizontal direction. The size of the holes (particularly the diameter) is slightly larger than the size of the microfossils, and one hole accommodates one microfossil. Thereby, the imaging unit 140 can image the microfossils in a state where the microfossils do not overlap each other. Specifically, the imaging unit 140 captures an image including microfossils that have each been disposed in one of a plurality of holes provided in the tray 130. Further, the suction robot 150 can more reliably adsorb the microfossil to be moved to the tip of the nozzle 151.

Figure 5:
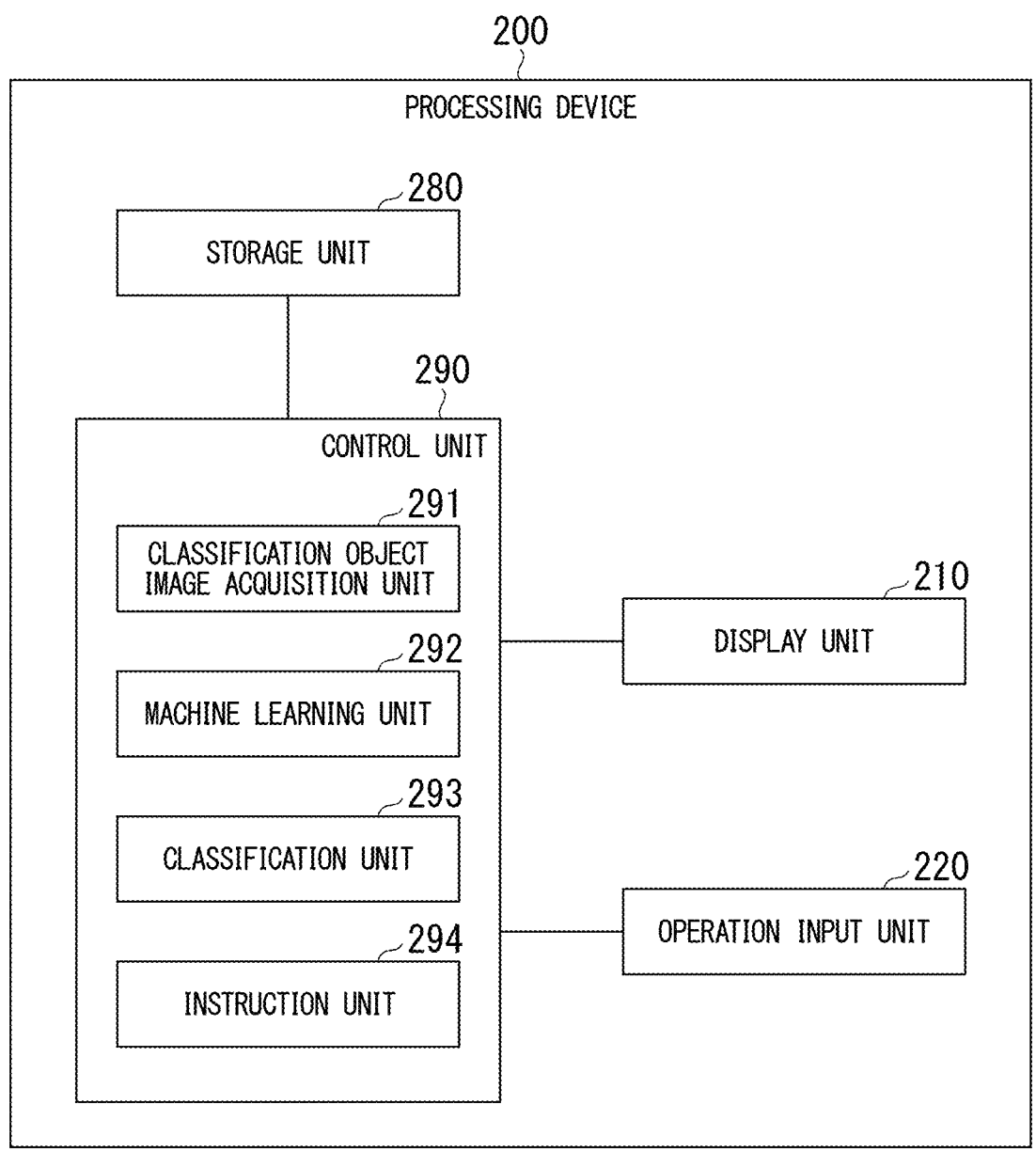
FIG. 5 is a schematic block diagram showing an example of a functional configuration of the processing device according to the example embodiment.

FIG. 5 is a schematic block diagram showing an example of the functional configuration of the processing device 200. With the configuration shown in FIG. 5, the processing device 200 includes a display unit 210, an operation input unit 220, a storage unit 280, and a control unit 290. The control unit 290 includes a classification object image acquisition unit (acquisition unit) 291, a machine learning unit 292, a classification unit 293, and an instruction unit 294.

The display unit 210 includes a display screen such as a liquid crystal panel or an LED (Light Emitting Diode) panel, and displays various images.

The operation input unit 220 includes an input device such as a keyboard and a mouse, and accepts user operations.

The storage unit 280 stores various types of data. The storage unit 280 is configured by using a storage device included in the processing device 200.

The control unit 290 controls each unit of the processing device 200 to execute various processes. The control unit 290 is configured by a CPU (Central Processing Unit) included in the processing device 200 reading a program from the storage unit 280 and executing the program.

The classification object image acquisition unit 291 acquires an image of each microfossil. Specifically, the classification object image acquisition unit 291 cuts out an image of each microfossil from an image including microfossils imaged by the imaging unit 140.

The machine learning unit 292 performs machine learning of the classification of the microfossil image by using some of the images of each microfossil cut out by the classification object image acquisition unit 291.

Specifically, the machine learning unit 292 selects some of the images of each microfossil cut out by the classification object image acquisition unit 291. Then, the machine learning unit 292 causes the selected images to be displayed on the display unit 210, and specifies the classification class for each image (for each microfossil) on the basis of a user operation received by the operation input unit 220. This class corresponds to the correct answer to the classification of the microfossil image.

Machine learning is performed on the classification of the microfossil images using learning data that combines the microfossil images and the classification of the images. As a result of the machine learning, the machine learning unit 292 receives an input of a microfossil image and acquires a model that outputs, for each classification class, the probability (certainty) of the image being classified into that class.

The machine learning method performed by the machine learning unit 292 is not limited to a specific method. For example, the machine learning unit 292 may perform machine learning by a neural network such as deep learning. Alternatively, the machine learning unit 292 may perform machine learning by Bayesian linear regression.

The classification unit 293 classifies the image of each microfossil cut out by the classification object image acquisition unit 291 using the machine learning results. Specifically, the classification unit 293 inputs the image of each microfossil cut out by the classification object image acquisition unit 291 into the model and, for each classification class, calculates the probability of that image being classified into that class.

Alternatively, since the classification class has already been determined for the image used for the learning data, the classification unit 293 may use the machine learning results to classify images other than images used in the learning data, among the images of each microfossil cut out by the classification object image acquisition unit 291.

The instruction unit 294 controls each unit of the imaging/placement device 100.

Specifically, the instruction unit 294 controls the electric stage 121 and the mobile part 112 to perform relative alignment between the tray 130 and the imaging unit 140, and causes the imaging unit 140 to perform imaging. The instruction unit 294 controls the electric stage 121 to move the tray 130 in the horizontal direction, and by repeatedly causing the imaging unit 140 to perform imaging, makes the imaging unit 140 image the entire upper surface of the tray 130.

Further, the instruction unit 294 controls the electric stage 121 to move the tray 130 in the horizontal direction, and positions the microfossil to be moved near the tip of the nozzle 151. Then, the instruction unit 294 controls the compressor 170 and the suction robot 150 to attract the microfossil to be moved to the tip of the nozzle 151 and lift it as described above. The instruction unit 294 controls the electric stage 121 to move the tray 130 in the horizontal direction, and brings the position of the destination of the microfossil on the tray 130 near the tip of the nozzle 151. The instruction unit 294 controls the compressor 170 and the suction robot 150 to drop the microfossil to the destination position on the tray 130 as described above.

The processing device 200 may be configured by using one computer. Alternatively, the processing device 200 may be configured using a plurality of computers, such as the machine learning unit 292, the classification unit 293, and the instruction unit 294 being configured by using separate computers.

The classification unit 293 may further specify the class to which the microfossils are classified.

For example, with regard to one microfossil (microfossil to be classified), if there is only one type of microfossil satisfying Equation (1) (num $(V_{rs})=1$), the classification unit 293 may classify that microfossil according to the type of that microfossil.

[Equation 1]

$$V_{rs} > \sigma r C + \mu_r \qquad (1)$$

"r" indicates an identification number for identifying the microfossil. "s" indicates an identification number for identifying the type of microfossil. "$V_{rs}$" indicates the probability that the microfossil identified by "r" (microfossil to be classified) is classified into the type of microfossil specified by "s". "$V_{rs}$" is obtained as the output of the learning result model.

"C" is a coefficient of a positive constant. "C" is referred to as an allowable coefficient.

"σr" is expressed as in Equation (2).

[Equation 2]

$$\sigma r = \sqrt{\frac{1}{n}\sum_{s=1}^{n}(V_{rs} - \mu_r)^2} \qquad (2)$$

"n" (n is an integer of n≥1) indicates the number of types of microfossils. That is, "n" indicates the number of classes to which microfossils are classified.

"$\mu_r$" indicates the average probability that a microfossil identified by "r" is classified into each class, and is expressed as in Equation (3).

[Equation 3]

$$\mu_r = \frac{1}{n}\sum_{s=1}^{n} V_{rs} \qquad (3)$$

FIG. 6 is a diagram showing an example of classification based on the criteria of Equation (1). In FIG. 6, for each of the four samples of particles a, b, c, and d, the probability $V_{rs}$ of classification into each of the microfossils A, B, C, and D, and a value obtained by adding the standard deviation (SD) to the average probability are shown. The particles a, b, c, and d correspond to examples of microfossils, respectively, and the microfossils A, B, C, and D correspond to examples of the types of microfossils, respectively.

In the example of FIG. 6, the probability V that satisfies Equation (1) for particle a is only 0.80 of the probability of classification into microfossil C. Therefore, the classification unit 293 classifies particle a into microfossil C.

In the case of particle b, the probability $V_{rs}$ of classification into microfossil A is 0.98, and the probability $V_{rs}$ of classification into microfossil D is 0.80, both of which satisfy Equation (1). In this case, since there are a plurality of probabilities $V_{rs}$ satisfying Equation (1), the classification unit 293 does not classify particle b into any type of microfossil.

The probability $V_{rs}$ that satisfies Equation (1) for particle c is only 0.60 of the probability of classification into microfossil C. Therefore, the classification unit 293 classifies particle c into microfossil C.

In the case of particle d, the probability $V_{rs}$ of classification into microfossil B is 0.98, and the probability $V_{rs}$ of classification into microfossil C is 0.90, both of which satisfy Equation (1). In this case, since there are a plurality of probabilities $V_{rs}$ satisfying Equation (1), the classification unit 293 does not classify particle d into any type of microfossil.

In the case of the above example, the particles b and d may be classified into a class called unclassified, which indicates that the particles b and d could not be classified into specific types of microfossils.

In this way, the classification unit 293, by classifying microfossils using Equation (1), classifies microfossils into specific microfossil types only when the probability of classification into a specific microfossil type is particularly greater than the probability of classification into other microfossil types. In this regard, the classification unit 293 can classify microfossils into specific microfossil types only if the reliability of classification into a specific microfossil type is particularly greater than the reliability of classification into another microfossil type.

The above-mentioned Equation (1) corresponds to an example of a predetermined condition for the classification unit 293 to classify an classification target object into any class only when the probability that an classification target object of a classification target is classified into one class is higher than the probability of being classified into another class by a predetermined condition or more. Further, the above-mentioned Equation (1) corresponds to an example of a predetermined condition for the classification unit 293 to classify an classification target object into the certain class only when the probability that an classification target object of a classification target is classified into a certain class is higher than the probability of being classified into another class by a predetermined condition or more.

Alternatively, the classification unit 293 may classify microfossils into types of microfossils in which the probability $V_{rs}$ is a maximum when Equation (4) holds, and may not classify microfossils into a specific microfossil type when Equation (4) does not hold.

[Equation 4]

$$\left(\left(\sum_s V_{rs}\right) - \max_s V_{rs}\right)^2 < \left(\frac{\left(\sum_s V_{rs}\right)}{C_1} - \max_s V_{rs}\right)^2 + \left(\frac{\left(\sum_s V_{rs}\right)}{C_2} - \max_{s-1} V_{rs}\right)^2 \quad (4)$$

"$C_i$" (i is an integer of i≥1) is a positive constant indicating the weight of each rank. Accordingly, "$C_1$" indicates the weight of the first class. "$C_2$" indicates the weight of the second class. For example, the value of both "$C_1$" and "$C_2$" is set to 2.

"$\max_{s-1} V_{rs}$" indicates the second-highest probability among the probability $V_{rs}$ for each type of microfossil.

The value of the maximum probability $V_{rs}$ among those of each type of microfossil is shown as on the right side of Equation (5).

[Equation 5]

$$V_r = \max_s V_{rs} \quad (5)$$

The probability $V_r$ is referred to as the probability of classification of a microfossil (microfossil to be classified) identified by "r."

FIG. 7 is a diagram showing an example of classification based on the criteria of Equation (4). In FIG. 7, for each of the four samples a, b, c, and d, the probability $V_{rs}$ of classification into each of the microfossils A, B, C, and D, and the values of the left side and the right side of Equation (4) are shown. The particles a, b, c, and d correspond to examples of microfossils, respectively, and the particles A, B, C, and D correspond to examples of the types of microfossils, respectively.

In the example of FIG. 7, for the particles a and c, Equation (4) is established for both of them. In the case of particle a, the classification unit 293 classifies it into microfossil C having a maximum probability $V_{rs}$ of 0.80. In the case of particle c, the classification unit 293 classifies it into microfossil C having a maximum probability $V_{rs}$ of 0.60.

On the other hand, for particles b and d, Equation (4) does not hold. Therefore, the classification unit 293 does not classify the particles b and d into specific types of microfossils. In this case, the particles b and d may be classified into a class called unclassified, which indicates that the particles b and d could not be classified into a specific type of microfossil.

In this way, the classification unit 293, by classifying microfossils using Equation (4), classifies microfossils into specific microfossil types only when the probability of classification into a particular microfossil type is particularly greater than the probability of classification into other microfossil types. In this regard, the classification unit 293 can classify microfossils into specific microfossil types only if the reliability of classification into specific microfossil types is particularly greater than the reliability of classification into other microfossil types.

The above-mentioned Equation (4) corresponds to an example of a predetermined condition for the classification unit 293 to classify an classification target object into any class only when the probability that an classification target object of a classification target is classified into a certain class is higher than the probability of being classified into another class by a predetermined condition or more.

Alternatively, the classification unit 293 may classify microfossils into types of microfossils having the maximum probability $V_{rs}$ when Equation (6) holds, and may not classify microfossils into a specific microfossil type when Equation (6) does not hold.

[Equation 6]

$$C < \frac{V_{rs}}{\left(\sum_s V_{rs}\right)} \quad (6)$$

In Equation (6), "C" is a positive constant indicating the allowable threshold of probability. For example, the constant C is set to 0.6.

FIG. 8 is a diagram showing an example of classification based on the criteria of Equation (6). In FIG. 8, for each of the four samples of particles a, b, c, and d, the probability $V_{rs}$ of classification into each of the microfossils A, B, C, and D, and the probability after normalization are shown. The particles a, b, c, and d correspond to examples of microfossils, respectively, and the particles A, B, C, and D correspond to examples of the types of microfossils, respectively.

Normalization here means dividing the probability $V_{rs}$ by the sum of probabilities so that the sum of probabilities becomes 1. The probability after normalization is expressed as "$V_{rs}/(\Sigma_s V_{rs})$" as shown on the right side of Equation (6).

In the example of FIG. 8, the value of the constant C is set to 0.6. For the particle a, the value of the probability of microfossil C after normalization of 0.73 is larger than 0.6. Therefore, the classification unit 293 classifies the particle a into microfossil C.

Also, for particle c, the probability value of 0.67 after normalization of the microfossil C is larger than 0.6. Therefore, the classification unit 293 classifies the particle c into microfossil C.

On the other hand, for particles b and d, the probability after normalization is constant C or less. Therefore, the classification unit 293 does not classify the particles b and d into specific types of microfossils. In this case, the particles b and d may be classified into a class called unclassified, which indicates that the particles b and d could not be classified into specific types of microfossils.

In this way, the classification unit 293, by classifying microfossils using Equation (6), classifies microfossils into specific microfossil types only when the probability of classification into a specific microfossil type is particularly greater than the probability of classification into other microfossil types. In this regard, the classification unit 293 can classify microfossils into specific microfossil types only if the reliability of classification into a specific microfossil type is particularly greater than the reliability of classification into another microfossil type.

The above-mentioned Equation (6) corresponds to an example of a predetermined condition for the classification unit 293 to classify an classification target object into any class only when the probability that an classification target object is classified into a certain class is higher than the probability of being classified into another class by a predetermined condition or more.

Alternatively, the classification unit 293 may calculate a composition ratio of the entire sample. The composition ratio referred to here is the ratio for each class in which microfossils contained in the sample are classified into each class.

For example, the classification unit 293 first calculates $V_s$ on the basis of Equation (7).

[Equation 7]

$$V_s = \sum_r \frac{V_{rs}}{\sum_s V_{rs}} \quad (7)$$

"$V_s$" indicates the sum of values obtained by normalizing the probability that, in a class specified by "s", each microfossil is classified into that class. The classification unit 293 normalizes $V_s$ as shown in Equation (8) to calculate the composition ratio.

[Equation 8]

$$V'_s = \frac{V_s}{\sum_s V_s} \quad (8)$$

"$V'_s$" indicates the composition ratio of the class specified by "s".

The classification unit 293 may insert a filter before the addition in Equation (7) so that a probability with a small value may not be incorporated into the composition ratio, or the influence of the probability with a small value may be reduced.

For example, the classification unit 293 may use "$V_{rsn}$" of Equation (9) instead of "$V_{rs}$".

[Equation 9]

$$V_{rsn} = V_{rs}^2 \quad (9)$$

By squaring "$V_{rs}$" as in Equation (9), the influence of low probability is reduced.

FIG. 9 is a diagram showing an example of a composition ratio calculated by the classification unit 293 using Equations (7) and (8). In FIG. 9, the probability $V_{rs}$ of classification into each of the microfossils A, B, C, and D is shown for each of the four samples of particles a, b, c, and d. The particles a, b, c, and d correspond to examples of microfossils, respectively, and the particles A, B, C, and D correspond to examples of the types of microfossils, respectively.

The probability $V_{rs}$ shown in FIG. 9 is the same as in the case of the example of FIG. 8. Therefore, the probability after normalization is similar to the probability after normalization shown in FIG. 8.

In the example of FIG. 9, the classification unit 293 calculates the probability $V_s$ by summing the probabilities after normalization for each type of microfossil based on Equation (7). The classification unit 293 calculates the probability $V_s$ of microfossil A as 0.62, the probability $V_s$ of microfossil B as 0.77, the probability $V_s$ of microfossil C as 2.00, and the probability $V_s$ of microfossil D as 0.63. The classification unit 293 normalizes these values, and as shown in FIG. 9, calculates the composition ratio $V'_s$ of microfossil A as 0.15, the composition ratio $V'_s$ of microfossil B as 0.19, the composition ratio $V'_s$ of fossil C as 0.50, and the composition ratio $V'_s$ of microfossil D as 0.16.

Alternatively, the classification unit 293 may classify all microfossils into any type of microfossil. For example, the classification unit 293 obtains the maximum probability $V_r$ among the probability $V_{rs}$ for each type of microfossil based on the above Equation (5). Then, when Equation (10) is satisfied the classification unit 293 classifies the microfossils into the types of microfossils having the maximum probability $V_{rs}$, and when Equation (10) is not satisfied, does not classify the microfossils into types of specific microfossils.

[Equation 10]

$$V_r > C \quad (10)$$

"C" in Equation (10) is a positive constant used as a threshold value of the probability $V_r$. "C" in Equation (10) is referred to as a probability tolerance constant.

FIG. 10 is a diagram showing an example of classification based on Equation (10). In FIG. 10, for each of the four samples of particles a, b, c, and d, the probability $V_{rs}$ of classification into each of microfossils A, B, C, and D is shown. The particles a, b, c, and d correspond to examples of microfossils, respectively, and the particles A, B, C, and D correspond to the examples of the types of microfossils, respectively.

When the value of the probability tolerance constant C is set to 0.95, Equation (10) is satisfied with the probability 0.98 of particle b being classified to microfossil A and the probability 0.98 of particle d being classified to microfossil B. In this case, the classification unit 293 classifies the particle b to microfossil A and the particle d to microfossil B.

On the other hand, when the value of the probability tolerance constant C is set to 0, the classification unit 293 classifies all the microfossils to the types of microfossils having the maximum probability $V_{rs}$. In the example of FIG. 10, the classification unit 293 classifies particle a to microfossil C, classifies particle b to microfossil A, classifies particle c to microfossil C, and classifies particle d to microfossil B.

In this way, when the classification unit 293 performs classification based on Equation (10), the degree to which microfossils are classified to the types of microfossils can be adjusted by adjusting the value of the probability tolerance constant C. In particular, by setting the value of the probability tolerance constant C to 0, the classification unit 293 can classify all the microfossils to the types of microfossils having the maximum probability $V_{rs}$.

Next, the operation of the classification device 1 will be described with reference to FIGS. 11 to 13.

Figure 11:
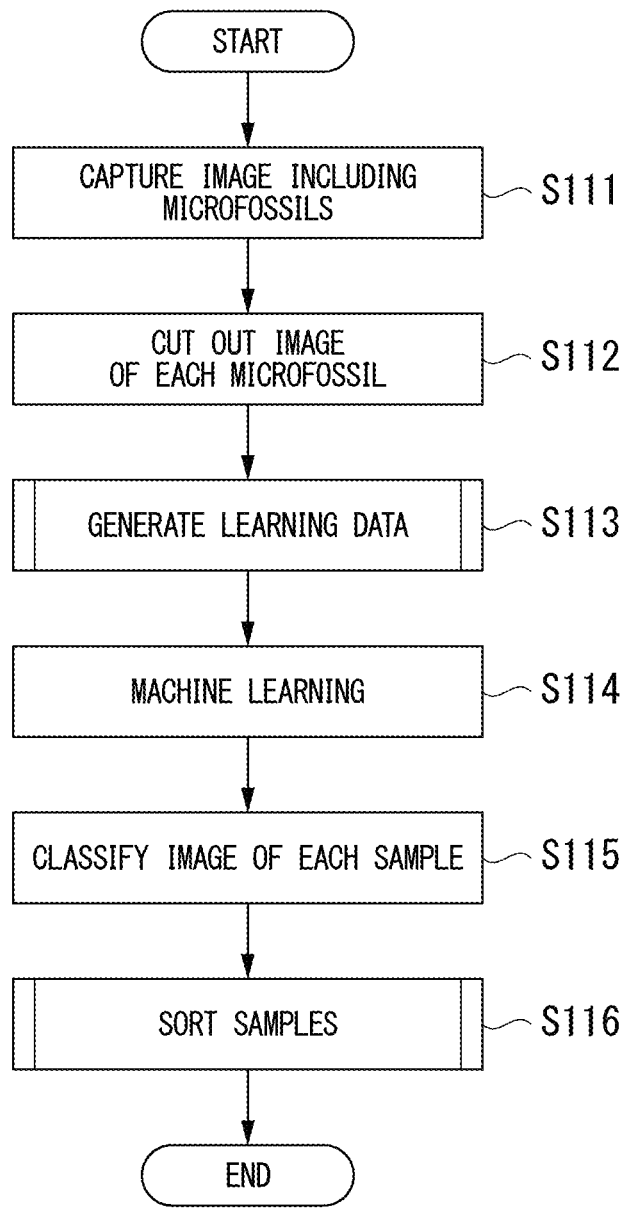
FIG. 11 is a flowchart showing an example of a processing procedure of the classification device according to the example embodiment.

FIG. 11 is a flowchart showing an example of the processing procedure of the classification device 1. The classification device 1, upon receiving a user operation instructing the start of processing in the state of microfossils prepared in the tray 130, starts the processing of FIG. 11.

In the processing of FIG. 11, the imaging device 142 captures an image including the microfossils under the control of the processing device 200 (Step S111). The classification object image acquisition unit 291 cuts out the image of each microfossil from the image captured by the imaging device 142 (Step S112).

Then, the machine learning unit 292 generates learning data using some of the obtained images (Step S113).

The machine learning unit 292 performs machine learning using the obtained learning data (Step S114).

The classification unit 293 classifies the images of each microfossil obtained in Step S111 based on the result of the machine learning (Step S115).

The classification device 1 sorts the microfossils in the tray 130 based on the classification result (Step S116).

Figure 12:
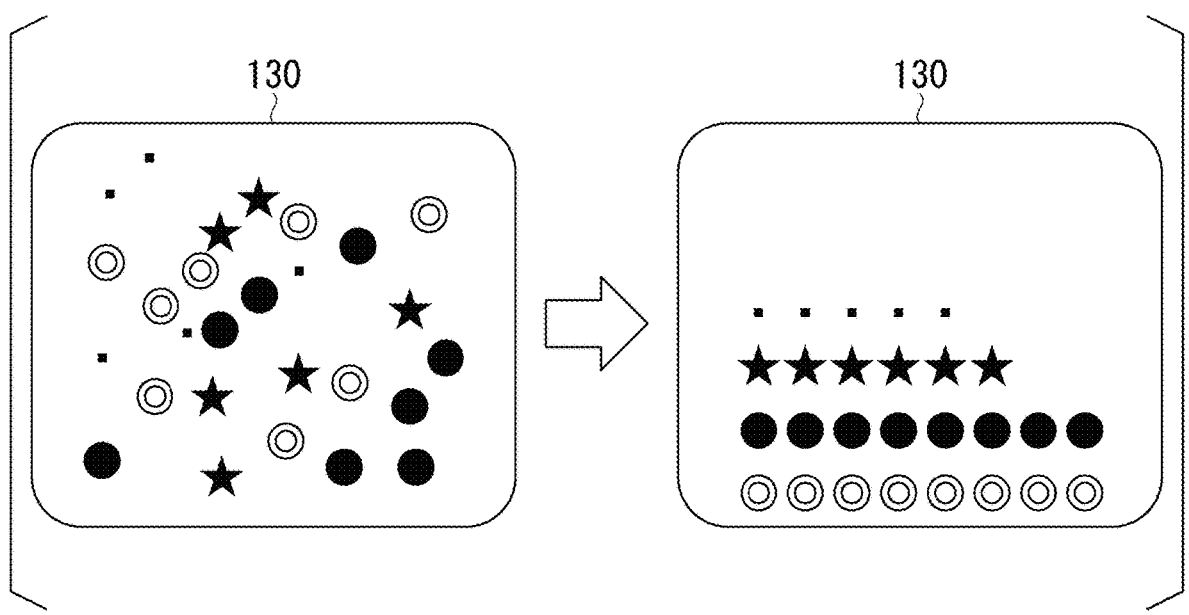
FIG. 12 is a diagram showing an example of sorting microfossils by the classification device according to the example embodiment.

FIG. 12 is a diagram showing an example of sorting microfossils by the classification device 1. In the example of FIG. 2, the classification device 1 arranges the microfossils in the horizontal direction of FIG. 12 for each type of microfossil. In this way, by the classification device 1 sorting the microfossils, the user can easily take out microfossils for each type of microfossil. Microfossils of unclassified classes may be arranged in a row separate from the row in which the microfossils are arranged by type.

After Step S116, the classification device 1 ends the process of FIG. 11.

Figure 13:
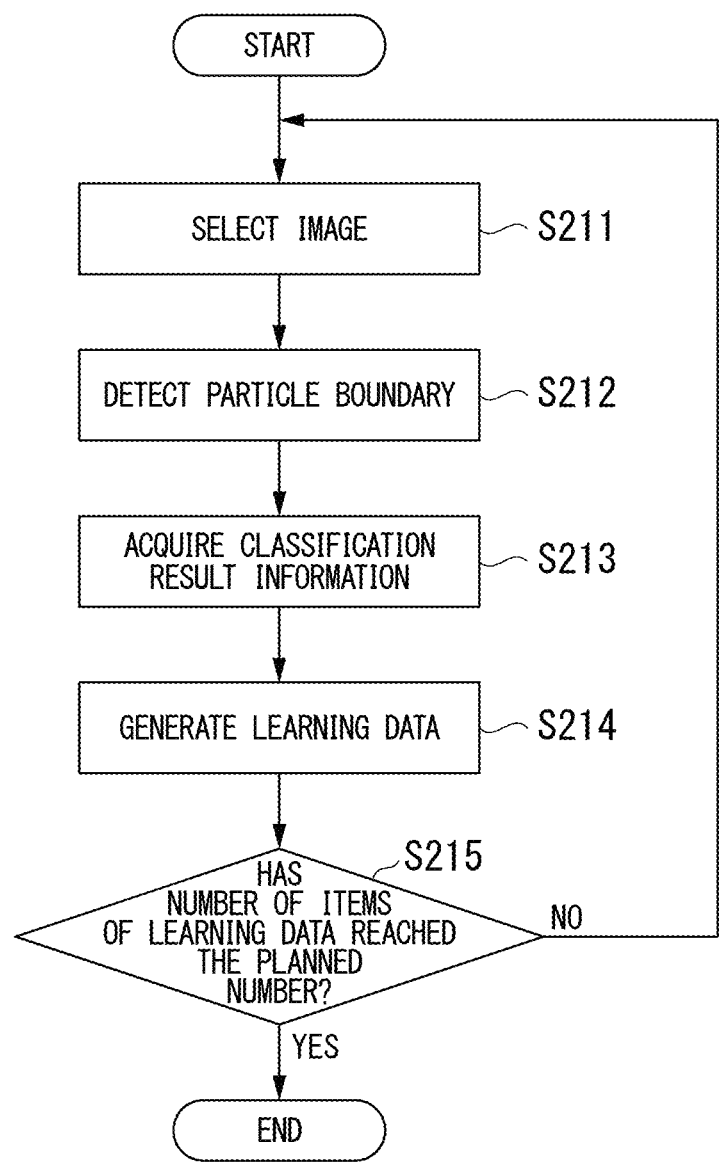
FIG. 13 is a flowchart showing an example of a processing procedure in which the classification device according to the example embodiment generates learning data.

FIG. 13 is a flowchart showing an example of a processing procedure in which the classification device 1 generates learning data. The classification device 1 performs the process of FIG. 13 in Step S113 of FIG. 11.

In the process of FIG. 13, the machine learning unit 292 selects any one of the images of each sample obtained in Step S111 of FIG. 11 as the image to be processed (Step S211). The method by which the machine learning unit 292 selects the image to be processed is not limited to a specific method. For example, the machine learning unit 292 may select the sample images one by one according to the arrangement of the samples in the tray 130. Alternatively, the display unit 210 may display an image of each sample, the operation input unit 220 may accept a user operation for selecting an image, and the machine learning unit 292 may select the image according to the user operation.

Next, the machine learning unit 292 detects the particle boundary of the selected image (Step S212). That is, the machine learning unit 292 detects the contour of the sample in the selected image.

Next, the machine learning unit 292 acquires the classification result information indicating the classification result of the image to be processed (Step S213). For example, the display unit 210 may display the image to be processed, and the operation input unit 220 may accept the input of the classification result by the user. Then, the machine learning unit 292 may acquire the information of the classification result by the user.

Then, the machine learning unit 292 generates learning data that combines the image to be processed and the classification result information of the image (Step S214).

Then, the machine learning unit 292 determines whether or not the number of items of learning data has reached the planned number (Step S215).

When the machine learning unit 292 determines that the number of items of learning data has not reached the planned number (Step S215: NO), the process returns to Step S211.

On the other hand, when the machine learning unit 292 determines that the number of items of learning data has reached the planned number (Step S215: YES), the classification device 1 ends the process of FIG. 13.

Figure 14:
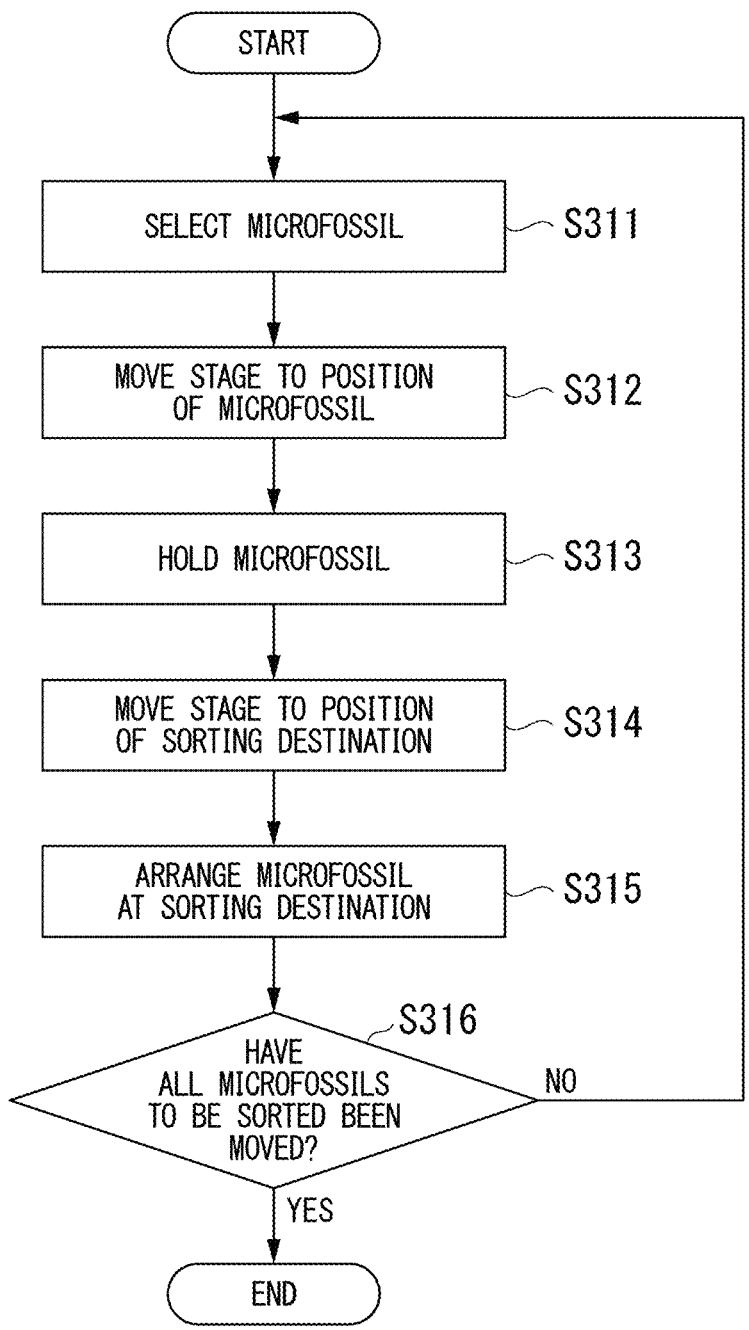
FIG. 14 is a flowchart showing an example of a processing procedure in which the classification device according to the example embodiment sorts microfossils.

FIG. 14 is a flowchart showing an example of the processing procedure in which the classification device 1 performs sorting of microfossils. The classification device 1 performs the process of FIG. 14 in Step S116 of FIG. 11.

In the process of FIG. 14, the instruction unit 294 selects the microfossils to be sorted based on the classification result of the microfossils, and determines the position of the sorting destination (Step S311).

Next, the electric stage 121 horizontally moves the tray 130 to a position where a microfossil to be sorted comes near the tip of the nozzle 151 according to the control of the indicator unit 294 (Step S312).

Then, the suction robot 150 holds the microfossil to be sorted at the tip of the nozzle 151 (Step S313). Specifically, the compressor 170 sucks air under the control of the indicator unit 294, so that the microfossil to be sorted is adsorbed on the tip of the nozzle 151. Then, the suction robot 150 lifts the tip of the nozzle 151.

The electric stage 121 horizontally moves the tray 130 so that the sorting destination position on the tray 130 is near the tip of the nozzle 151 according to the control of the indicator unit 294 (Step S314).

Then, the suction robot 150 arranges the microfossil to be sorted at the sorting destination position according to the control of the instruction unit 294 (Step S315). Specifically, as described above, the suction robot 150 lowers the tip of the nozzle 151, and the compressor 170 stops sucking air, so that the microfossil to be sorted is dropped to the sorting destination position.

The instruction unit 294 determines whether or not all the microfossils to be sorted have been sorted (Step S316).

If the indicator 294 determines that there are still unsorted microfossils (Step S316: NO), the process transitions to Step S311.

On the other hand, when the instruction unit 294 determines that all the microfossils to be sorted have been sorted (Step S316: YES), the classification device 1 ends the process of FIG. 14.

As described above, the imaging unit 140 captures an image including granular classification target objects that have each been disposed in one of a plurality of holes provided in the tray. The classification object image acquisition unit 291 cuts out an image of each classification target object from the image including classification target objects. The combination of the electric stage 121, the tray 130, the suction robot 150, the tube 160, and the compressor 170 sorts classification target objects on the basis of the classification result of classifying the obtained images of the classification target objects using the machine learning results.

In this way, the classification device 1 can automatically perform classification and sorting by classifying and sorting images of the classification target objects using the machine learning results. According to the classification device 1, in this respect the burden on the person when classifying fine particles is relatively small.

Further, the imaging unit 140 captures an image including granular classification target objects that have each been disposed in one of a plurality of holes provided in the tray. The classification object image acquisition unit 291 cuts out an image of each classification target object from the image including the classification target objects. The classification unit 293 classifies the acquired images of the classification target objects using the machine learning results.

In this way, the classification device 1 can automatically perform classification by classifying the images of the classification target object using the machine learning results. According to the classification device 1, in this respect the burden on the person when classifying the fine particles is relatively small.

In addition, the classification unit 293 calculates, for each class of the classification destination of an classification target object, the probability that that classification target object is classified into that class using the machine learning results.

According to the classification device 1, the user can ascertain the certainty of an classification target object being classified into a certain class by referring to the probability.

Further, only when the probability of the classification target object of a classification target being classified into a certain class is higher than the probability of being classified into another class by a predetermined condition or more, the classification unit 293 classifies the classification target object into any class.

When the probability of an classification target object of a classification target being classified into a certain class is higher than the probability of being classified into another class by a predetermined condition or more, it is considered highly probable that the classification target object will be classified into that class. According to the classification device 1, in this respect, the classification of the classification target object can be performed with high accuracy.

In addition, the classification unit 293 calculates the composition ratio for each class in the entire plurality of classification target objects on the basis of the probability of the classification target object being classified into the class.

According to the classification device 1, the user can know the composition ratio in the entire classification target object.

The combination of the electric stage 121, the tray 130, the suction robot 150, the tube 160, and the compressor 170 sorts the classification target objects on the basis of the classification result of the classification target objects.

This simplifies retrieval by the user of the classification target object for each class.

Next, a configuration example of the example embodiment of the present invention will be described with reference to FIGS. 15 and 16.

Figure 15:
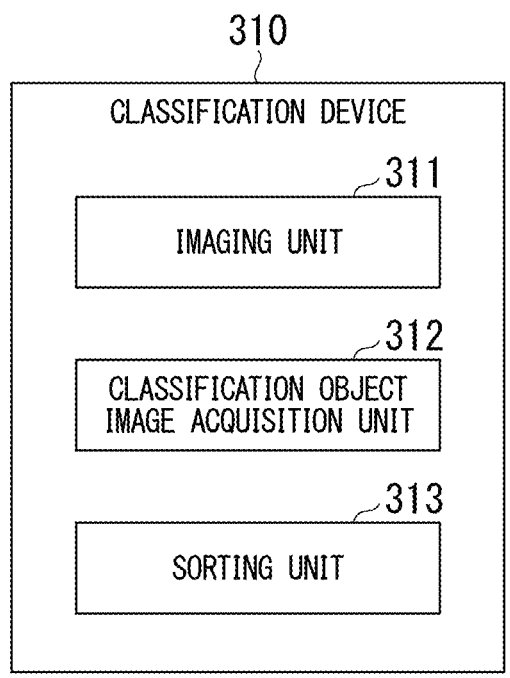
FIG. 15 is a diagram showing an example of a configuration of a classification device according to an example embodiment according to the example embodiment.

FIG. 15 is a diagram showing an example of the configuration of the classification device according to the example embodiment. With the configuration shown in FIG. 15, the classification device 310 includes an imaging unit 311, a classification object image acquisition unit 312, and a sorting unit 313.

With such a configuration, the imaging unit 311 captures an image including granular classification target objects that have each been disposed in one of a plurality of holes provided in the tray. The classification object image acquisition unit 312 cuts out an image of each classification target object from the image including the classification target objects. The sorting unit 313 sorts the obtained images of the classification target objects based on the classification results classified using the machine learning results.

In this way, the classification device 310 can perform classification and sorting automatically by classifying and sorting images of classification target objects by using the machine learning results. According to the classification device 310, in this respect, the burden on the person when classifying the fine particles is relatively small.

Figure 16:
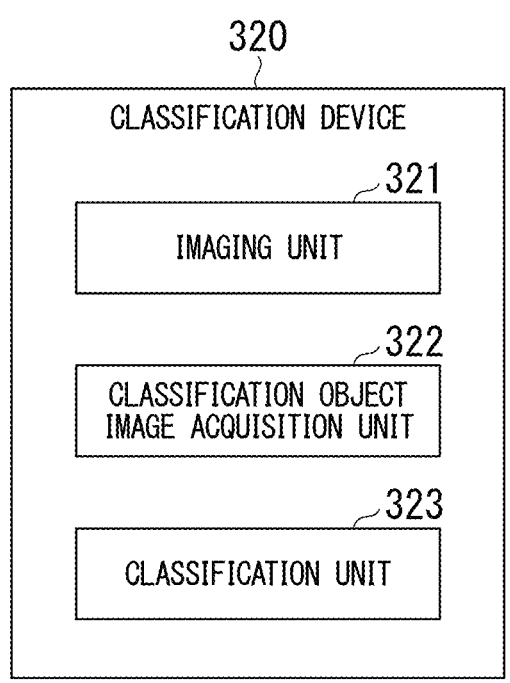
FIG. 16 is a diagram showing another example of the configuration of the classification device according to the example embodiment according to the example embodiment.

FIG. 16 is a diagram showing another example of the configuration of the classification device according to the example embodiment. With the configuration shown in FIG. 16, a classification device 320 includes an imaging unit 321, a classification object image acquisition unit 322 and a classification unit 323.

With such a configuration, the imaging unit 321 captures an image including granular classification target objects that have each been disposed in one of a plurality of holes provided in the tray. The classification object image acquisition unit 322 cuts out an image of each classification target object from the image including the classification target objects. The classification unit 323 classifies the obtained images of the classification target objects using the machine learning results.

In this way, the classification device 320 can automatically perform classification by classifying the images of the classification target objects using the machine learning results. According to the classification device 320, in this respect, the burden on the person when classifying fine particles is relatively small.

As described above, the processing device 200 is configured by using a computer. A program for executing all or some of the processing performed by the processing device 200 may be recorded on a computer-readable recording medium, and the processing of each part may be performed by reading the program recorded on the recording medium into a computer system and executing the program. The term "computer system" as used herein includes hardware such as an OS and peripheral devices.

The "computer-readable recording medium" refers to a portable medium such as a flexible disk, a magneto-optical disk, a ROM, or a CD-ROM, or a storage device such as a hard disk built in a computer system. Further, the above-mentioned program may be a program for realizing some of the above-mentioned functions, and may be a program for realizing the above-mentioned functions in combination with a program already recorded in the computer system.

As above, although the example embodiments of the present invention has been described in detail with reference to the drawings, a specific configuration is not limited to the example embodiments, and a design and the like in a range not departing from the concept of the present invention are included therein.

INDUSTRIAL APPLICABILITY

The present invention may be applied to an image processing device, an image processing method, and a recording medium.

DESCRIPTION OF THE REFERENCE SYMBOLS

1, 310, 320: Classification device
100: Imaging/placement device
111: Support
112: Mobile part
120: Placement table
121: Electric stage
130: Tray
140, 311, 321: Imaging unit
141: Microscope
142: Imaging device
150: Suction robot
151: Nozzle
160: Tube
170: Compressor
200: Processing device
210: Display unit
220: Operation input unit
280: Storage unit
290: Control unit
291, 312, 322: Classification object image acquisition unit
292: Machine learning unit
293, 323: Classification unit
294: Instruction unit
313: Sorting unit

The invention claimed is:

1. A classification device comprising:
a camera configured to capture an images of a plurality of granular classification target objects each of which is disposed in one of a plurality of holes provided in a tray;
at least one memory configured to store instructions; and
at least one processor configured to execute the instructions to:

acquire images of each of the plurality of granular classification target objects by cutting out the images from the image; and classify the acquired images of each of the plurality of granular classification target objects by using machine learning results, wherein classifying the acquired images comprises assigning one granular classification target object of the plurality of granular classification target objects to a class corresponding to a highest probability among probabilities for each of a plurality of classes of the one granular classification target object in a case where a first value is smaller than a total of a second value and a third value, wherein the first value is a square of a value obtained by subtracting the highest probability from a total of the probabilities for the plurality of classes, wherein the second value is a square of a value obtained by subtracting the highest probability from a value that is obtained by dividing the total of the probabilities for the plurality of classes by a first weight coefficient, wherein the third value is a square of a value obtained by subtracting a second highest probability among the probabilities for each of the plurality of classes of the granular classification target object from a value that is obtained by dividing the total of the probabilities for the plurality of classes by a second weight coefficient.

2. The classification device according to claim 1, wherein the at least one processor is further configured to execute the instructions to sort the plurality of granular classification target objects based on the classification result.

3. The classification device according to claim 1, wherein the at least one processor is further configured to execute the instructions to calculate, for each of a plurality of classes respectively corresponding to separate classifications and for each of the plurality of granular classification target objects, a probability of that granular classification target object being assigned to that class, by using the machine learning results.

4. The classification device according to claim 3, wherein the at least one processor is further configured to execute the instructions to calculate, based on the probability for each of the plurality of classes and for each of the plurality of granular classification target objects, a composition ratio for the entire plurality of granular classification target objects for each of the plurality of classes.

5. A classification method comprising:
capturing an image of a plurality of granular classification target objects each of which is disposed in one of a plurality of holes provided in a tray;
acquiring images of each of the plurality of granular classification target objects by cutting out the images from the captured image; and
classifying the acquired images of each of the plurality of granular classification target objects by using machine learning results,
wherein classifying the acquired images comprises assigning one classification target object of the plurality of granular classification target objects to a class corresponding to a highest probability among probabilities for each of a plurality of classes of the one granular classification target object in a case where a first value is smaller than a total of a second value and a third value,
wherein the first value is a square of a value obtained by subtracting the highest probability from a total of the probabilities for the plurality of classes,
wherein the second value is a square of a value obtained by subtracting the highest probability from a value that is obtained by dividing the total of the probabilities for the plurality of classes by a first weight coefficient,
wherein the third value is a square of a value obtained by subtracting a second highest probability among the probabilities for each of the plurality of classes of the one granular classification target object from a value that is obtained by dividing the total of the probabilities for the plurality of classes by a second weight coefficient.

6. The classification method according to claim 5, further comprising
sorting the plurality of granular classification target objects based on the classification result.

7. A non-transitory recording medium that stores a program that causes a computer to execute:
capture an image of a plurality of granular classification target objects each of which is disposed in one of a plurality of holes provided in a tray;
acquiring images of each of the plurality of granular classification target objects by cutting out the images from the captured image; and
classifying the acquired images of each of the plurality of granular classification target objects by using machine learning results,
wherein classifying the acquired images comprises assigning one granular classification target object of the plurality of granular classification target objects to a class corresponding to a highest probability among probabilities for each of a plurality of classes of the one granular classification target object in a case where a first value is smaller than a total of a second value and a third value,
wherein the first value is a square of a value obtained by subtracting the highest probability from a total of the probabilities for the plurality of classes,
wherein the second value is a square of a value obtained by subtracting the highest probability from a value that is obtained by dividing the total of the probabilities for the plurality of classes by a first weight coefficient,
wherein the third value is a square of a value obtained by subtracting a second highest probability among the probabilities for each of the plurality of classes of the one granular classification target object from a value that is obtained by dividing the total of the probabilities for the plurality of classes by a second weight coefficient.

8. The recording medium according to claim 7, wherein the program causes the computer to execute sorting the plurality of granular classification target objects based on the classification result.

* * * * *